United States Patent Office 3,746,515
Patented July 17, 1973

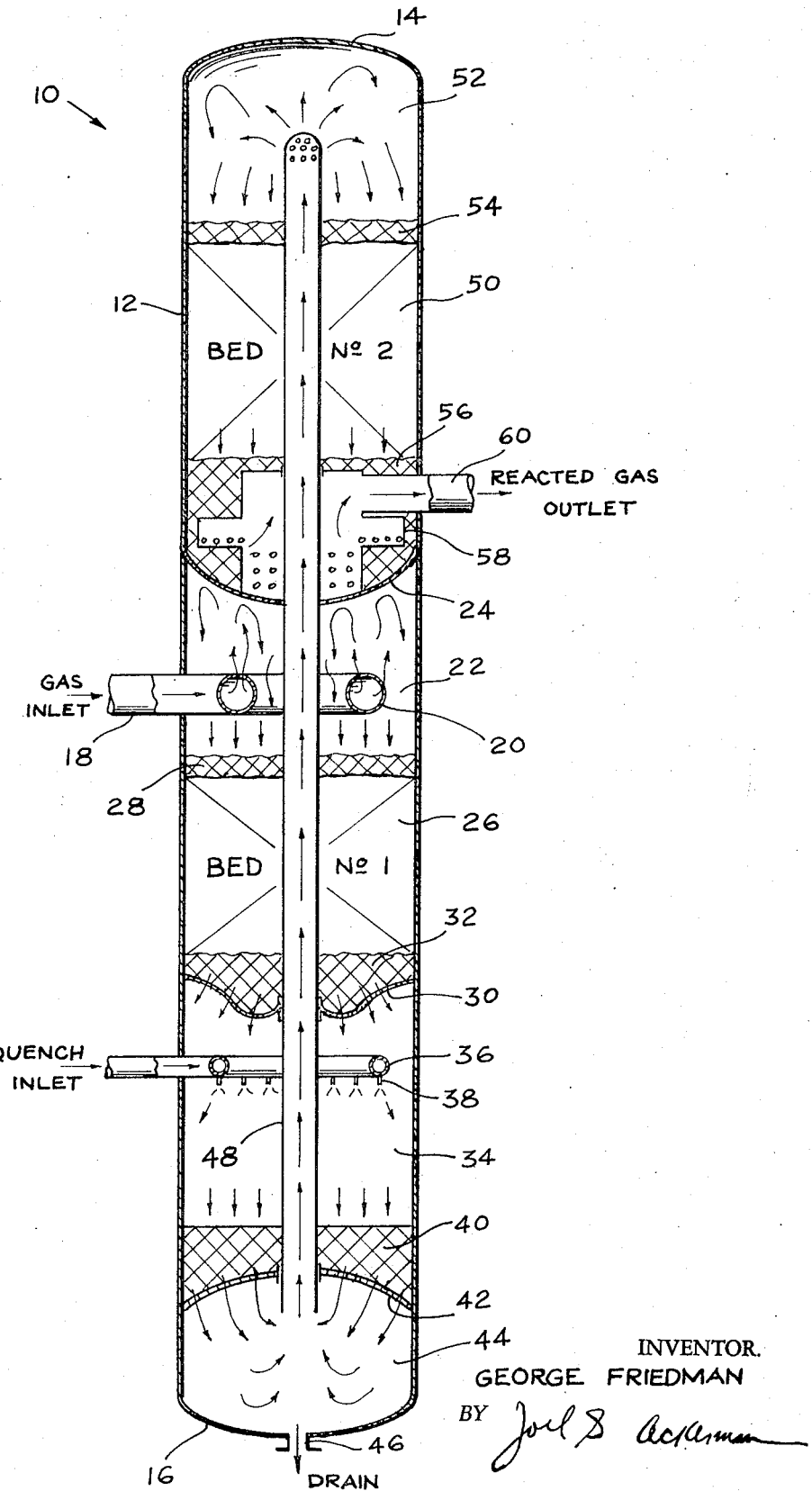

3,746,515
TWO-STAGE HIGH TEMPERATURE SHIFT REACTOR
George Friedman, Clark, N.J., assignor to The Lummus Company, Bloomfield, N.J.
Filed Oct. 13, 1971, Ser. No. 188,970
Int. Cl. B01j 9/04
U.S. Cl. 23—288 R   6 Claims

ABSTRACT OF THE DISCLOSURE

A high-temperature high-pressure reactor vessel, such as a shift reactor for synthesis gas. A vertical shell is provided with a first stage catalyst bed therein disposed above a quench chamber and below a second stage catalyst bed. The gas is conducted downward in series through the first bed and the quench, upward via a central riser tube and then downward through the second stage bed for exit from the shell.

BACKGROUND OF THE INVENTION

Various deficiencies have been recognized with regard to conventional shift reactors wherein efficiency of operation can be maintained only by substantially increasing cost. For example, one form of conventional shift reactor comprises a single vessel in which a first stage catalyst bed is disposed at the top so that the gas flows downwardly therethrough, and then downward through a direct quenching zone, and then further downward into a second stage catalyst bed, thereby requiring that the quench zone be equipped with apparatus to prevent flow of the liquid quenching agent into the second stage. In another conventional type shift reactor the quenching chamber is separated from the structure of the first and second stage catalyst beds, thereby requiring external, high-pressure high-temperature piping to conduct the gas to and from the quenching chamber. Furthermore in another conventional shift reactor, three separate vessels are provided, one for each reaction stage and one for the interstage quenching chamber, thus further increasing the requirements for external high-pressure high-temperature piping. An object of the present invention is to eliminate the necessity of such external high-pressure high-temperature piping, and also to eliminate necessity of expensive equipment necessary to prevent the quenching liquid from enterting the second catalyst bed.

SUMMARY OF THE INVENTION

In accordance with this invention, there is provided a single reactor vessel suitable for two stages of shift conversion with an interstage quench therebetween. The reactor is disposed vertically with the second stage catalyst bed positioned in the upper portion of the vessel, the quenching chamber in the lower portion and the first stage catalyst bed therebetween. Thus, because the quenching chamber is positioned in the lower portion and the second stage catalyst bed in the upper portion of the vessel, there is no danger that the quench liquid will be able to enter the second catalyst bed.

More particularly, the vessel is provided centrally with a gas inlet whereby the gas enters the vessel and then flows downwardly into the first stage catalyst bed through a layer of inert material comprising the cover of the first stage bed. This cover protects the first stage bed from being upset and promotes uniform distribution of the gas. A perforated dish-shaped head is provided at the lower portion of the first stage bed, and is filled with an inert material through which the gas passes downwardly into the quenching chamber. The lower portion of the first stage bed acts as a catalyst support. A quenching liquid is discharged downwardly in the quenching chamber toward another layer of inert material which acts as a wetted surface to promote evaporation of any coalesced liquid droplets and which covers a perforated, inverted dish-shaped head through which the vapor-gas mixture resulting from the quenching of the gas flows into a lower plenum defined by the lower face of the inverted head, and the bottom head of the vessel. A drain is provided in the bottom head of the vessel. A riser tube passes upwardly through the vessel, centrally of the quenching chamber, the first stage catalyst bed, and the second stage catalyst bed respectively, and is provided with a perforated upper end through which the vapor-gas mixture is discharged into an upper plenum defined by the top head of the vessel and a cover of inert material for the second stage catalyst bed. The mixture then flows downwardly through the cover and into the second stage bed which also has a dish-shaped head in its lower portion filled with an inert material. The riser tube is in sealed engagement with the dish-shaped head in the second stage bed. A vapor-gas collection plenum formed by perforated, screened plating is disposed within such dish-shaped head and is covered with the inert material for collecting the reacted gas which then flows out of the vessel through an outlet pipe.

All of the internal piping of the vessel is attached in a manner which permits unrestrained thermal expansion, thus precluding mechanical failures due to restrained thermal expansion, with the result that the apparatus according to the invention is a two stage reactor with interstage quenching which operates reliably and efficiently, and which can be manufactured at a relatively low cost.

BRIEF DESCRIPTION OF THE DRAWING

The accompanying drawing illustrates a preferred embodiment of the invention and shows a vertical section thereof.

DETAILED DESCRIPTION OF THE PREFERRED EMBODIMENT

A shift reactor according to the invention, as shown in the drawing, comprises a single vessel 10 having vertically disposed side walls 12, sealed at their upper and lower ends by top and bottom heads 14 and 16, respectively. The gas (which is to be processed by the shift reactor) flows into the vessel through inlet pipe 18 which communicates with toroidal pipe 20 disposed within inlet chamber 22 of the vessel at a position near the longitudinal and radial center thereof. Toroidal pipe 20 is perforated at its upper face so that the incoming gas is directed upwardly within inlet chamber 22, whereupon it impinges against the surface of baffle 24 which reverses the flow direction of the gas and causes it to flow downwardly in the vessel toward first stage catalyst bed 26. Bed 26 is provided with cover 28 formed of a gas pervious inert material which distributes the gas evenly within the first stage catalyst bed as it flows thereto from the inlet chamber.

Perforated and screened support member 30 is mounted beneath the first stage bed and is filled with a quantity of inert material 32 through which the gas flows in its downward path toward quenching chamber 34. A quench liquid is fed into chamber 34 through an inlet conduit to toroidal distribution header 36 within chamber 34. Quenching liquid header 36 has a plurality of downwardly directed spray nozzles 38, thereby causing the quench liquid to spray downwardly with the gas toward another layer of inert material 40 supported on the upper surface of perforated and screened dish-shaped head 42. The vapor-gas mixture which passes through the perforations in dish-shaped head 42 pass into lower plenum 44 defined by bottom head 16 of the vessel and the lower surface of dish-shaped head 42. The vapor-gas mixture then reverses its flow direction on a curved inner surface of bottom head 16, and then flows upwardly through riser tube 48 disposed axially through quenching chamber 34, first stage catalyst bed 26, inlet chamber 22, and second stage catalyst bed 50 to upper plenum 52 defined by the inner surface of top head 14 and gas-pervious cover 54 of second stage bed 50. The upper end of riser tube 48 is perforated to disperse the vapor-gas mixture as it is emitted from riser tube 48, whereupon the gas again assumes a downward flow through second stage cover 54, comprising an inert material, and into second stage bed 50. Baffle 24, which forms the upper limit of inlet chamber 22, comprises an imperforate dish-shaped head forming the bottom limit of the second stage bed, and head 24 is also filled with inert material 56 which covers vapor collection plenum 58 formed from perforated sheet material. The vapor-gas mixture, when it reaches plenum 58, is in a fully processed condition and is discharged from the vessel through gas outlet tube 60, coupled through the wall of the vessel and into plenum 58.

Thus, as disclosed herein, there is provided a two stage shift reactor having an interstage quench chamber, wherein there is no danger of passage of quench liquid into the second stage bed, and wherein the entire process is accomplished in a single vessel. During the processing of a gas, inert material 40, which comprises a ceramic material, accelerates the vaporization of the quenching liquid, and lower plenum 44 provides an increased residence time prior to the flow of the mixture upwardly through riser tube 48. Because the riser tube passes centrally through high-temperature catalyst beds 26 and 50, tube 48 is maintained in a slightly heated condition to insure final vaporization of any droplets which become entrained by the rising vapor-gas mixture.

All of the internal connections between the tubing, the chamber elements, and the vessel structure are so designed to prevent any mechanical failures due to restrained thermal expansion, so that the resultant vessel provides a highly effective and reliable reactor.

For any system using the reactor of this invention, the quench must be a reagent involved in the particular reaction. By way of example, in shift conversion of synthesis gas, cooling the first stage effluent with direct injection of water acts in two ways to promote higher hydrogen production in that adding water pushes the following equation to the right and removing heat does likewise.

$$CO + H_2O \rightleftharpoons CO_2 + H_2 + Q$$

Similarly, if the reactor were used in multi-stage burning (oxidation), cool air injection would serve the same dual purposes.

It will be understood by those familiar with vessel design and/or the processes to which they pertain, that wide deviations may be made from the foregoing specification without departing from the main theme of invention set forth in the claims which follow.

I claim:

1. In a reactor for processing a gas through first and second stage catalyst beds and through an interstage quenching chamber, an improvement comprising a vertically disposed reactor vessel having a cylindrical side wall as well as upper and lower heads connected to said side wall, a gas inlet conduit connected through said side wall for introducing a gas internally of said vessel, a first stage catalyst chamber disposed below said gas inlet conduit and a second stage catalyst chamber disposed above said gas inlet conduit, an inlet chamber defined between said first and second stage catalyst chambers and in flow communication with said gas inlet conduit, said first stage catalyst chamber having a gas-pervious cover at its upper portion and a perforated head at its lower portion whereby a path for gas flow is provided from said inlet chamber through said first stage catalyst chamber and then through said perforated head, a quenching chamber in said vessel below said perforated head, a quench liquid inlet conduit connected through said side wall in flow communication with said quenching chamber for introducing a quench liquid for combination with said gas to form a vapor-gas mixture, said quenching chamber having a second perforated head in its lower portion, a lower plenum defined between said second perforated head and said lower vessel head, said second stage catalyst chamber having a gas-pervious cover spaced from said upper head of the vessel, an upper plenum defined between said second stage chamber cover and said upper vessel head, a riser tube disposed vertically within said vessel and in flow communication at its respective lower and upper ends with said lower and upper plena to provide an upward flow path for said vapor-gas mixture, said second stage catalyst chamber having an imperforate head defining its lower limit, a perforated plenum supported above said imperforate head and adjacent thereto for collecting said vapor-gas mixture, and a vapor-gas discharge conduit connected through said side wall and in flow communication with said perforated plenum.

2. The reactor as set forth in claim 1, in which said riser tube is disposed centrally of said vessel and passes through said first and second stage chambers, whereby said tube is heated by said chambers and finally vaporizes any quench liquid droplets entrained in the upward flowing vapor-gas mixture in said tube.

3. The reactor as set forth in claim 1, in which said upper and lower heads define curved means at their inner surfaces for reversing the flow direction of said vapor-gas mixture.

4. The reactor as set forth in claim 1, in which said first and second stage gas pervious covers comprise layers of inert material.

5. The reactor as set forth in claim 4, further comprising liquid spray means disposed within said quenching chamber and in communication with said quench liquid inlet conduit for spraying said quench liquid downwardly in said quenching chamber, and in which a third layer of inert material is disposed on said second perforated head within said quenching chamber, said third layer of inert material comprising a ceramic material for accelerating vaporization of said quench liquid.

6. The reactor as set forth in claim 4, further comprising a toroidal gas inlet pipe horizontally disposed within said inlet chamber and in communication with said gas inlet conduit, said inlet pipe having a plurality of upwardly directed openings for introducing said gas within said inlet chamber.

References Cited

UNITED STATES PATENTS

| | | | |
|---|---|---|---|
| 2,198,795 | 4/1940 | Titlestad | 23—288 R |
| 2,543,743 | 2/1951 | Evans. | |
| 2,835,559 | 5/1958 | Bähr | 23—288 R |
| 3,010,807 | 11/1961 | Christensen et al. | 23—288 R |
| 3,211,641 | 10/1965 | Halik et al. | 23—288 RX |
| 3,262,758 | 7/1966 | James et al. | 23—288 R |
| 3,433,600 | 3/1969 | Christensen et al. | 23—288 R |
| 3,480,407 | 11/1969 | Wentworth et al. | 23—288 R |
| 3,592,613 | 7/1971 | Boyd | 23—288 R |
| 3,598,542 | 8/1971 | Carson et al. | 23—288 R |
| 3,702,238 | 11/1972 | Armistead et al. | 23—288 R |

BARRY S. RICHMAN, Primary Examiner

U.S. Cl. X.R.

23—288 K, 289; 423—655